(No Model.) 3 Sheets—Sheet 1.

F. L. McKILLIP.
CLUTCH PULLEY.

No. 500,289. Patented June 27, 1893.

Witnesses:
Heman Miller
J. A. Jamison

Inventor:
Frank L. McKillip.
By G. H. Abbell, his Atty.

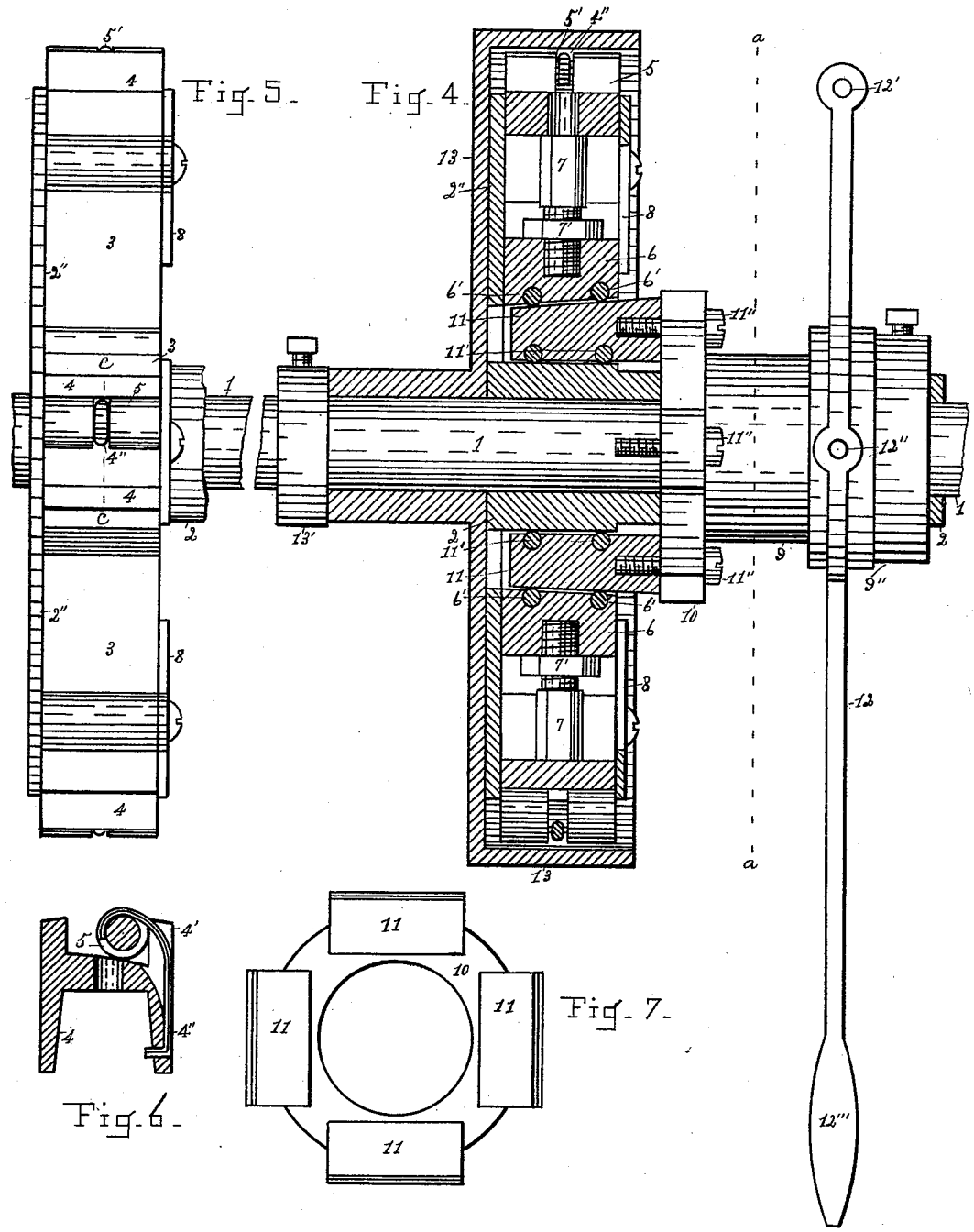

(No Model.) 3 Sheets—Sheet 3.

F. L. McKILLIP.
CLUTCH PULLEY.

No. 500,289. Patented June 27, 1893.

Witnesses
C. M. Albee
Heman Miller

Inventor
Frank L. McKillip
By G. H. Albee
his Atty.

UNITED STATES PATENT OFFICE.

FRANK L. McKILLIP, OF MENASHA, WISCONSIN.

CLUTCH-PULLEY.

SPECIFICATION forming part of Letters Patent No. 500,289, dated June 27, 1893.

Application filed December 5, 1892. Serial No. 454,118. (No model.)

*To all whom it may concern:*

Be it known that I, FRANK L. MCKILLIP, a citizen of the United States, residing at Menasha, in the county of Winnebago and State of Wisconsin, have invented a new and useful Improvement in Clutch-Pulleys, of which the following is a specification.

My invention relates to a friction clutch mechanism which is secured upon a shaft and is for use in connection with a pulley revolving loosely upon said shaft, and consists of a shaft having secured thereon a hub having one or more arms provided with grooves which extend radially from the shaft and contain sliding mechanism for producing a powerful clutch upon the inner surface of a pulley revoluble loosely upon said shaft when said clutching mechanism revolves in the direction for which it may be constructed for connecting with a pulley, and having also a sleeve slidable upon the hub aforesaid, which sleeve is provided with a shifting lever and wedges for forcing the clutching mechanism against the inner face of said pulley rim, and the object of my improvement is, to provide a mechanism for connecting said clutch shaft and pulley rim in a quick and positive manner when revolved in the direction for which the clutching mechanism may be constructed, but which will be disconnected when revolved in the opposite direction. I attain these objects by the mechanism illustrated in the accompanying drawings, in which—

Figure 1:
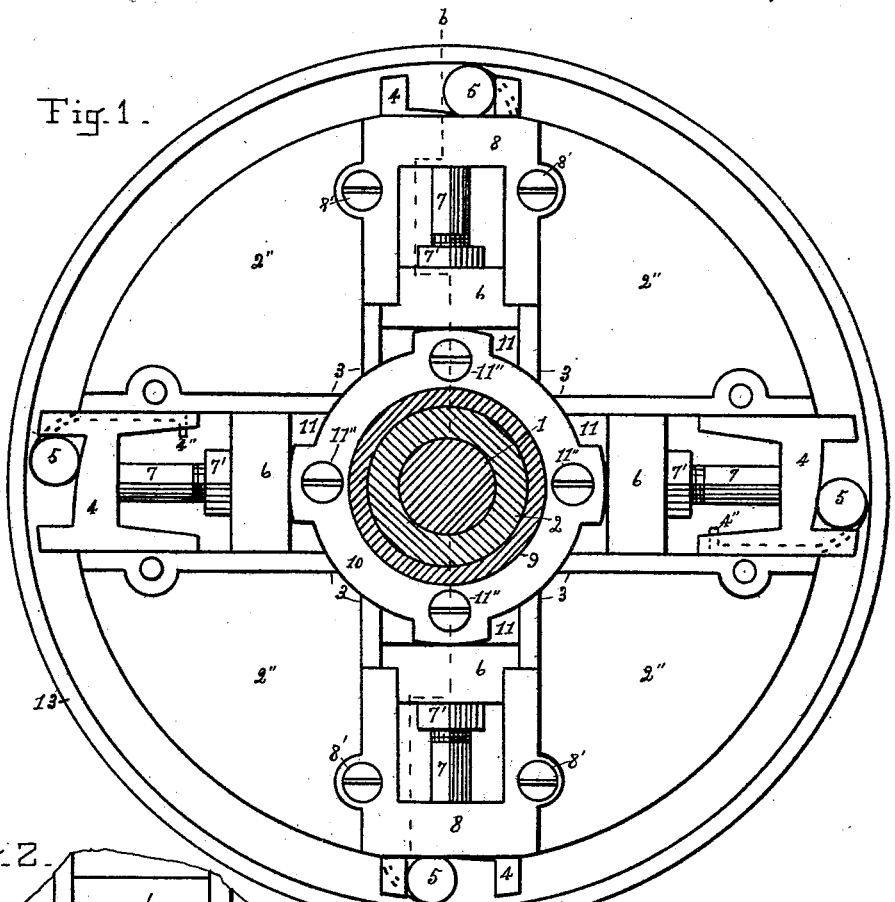
Figure 2:
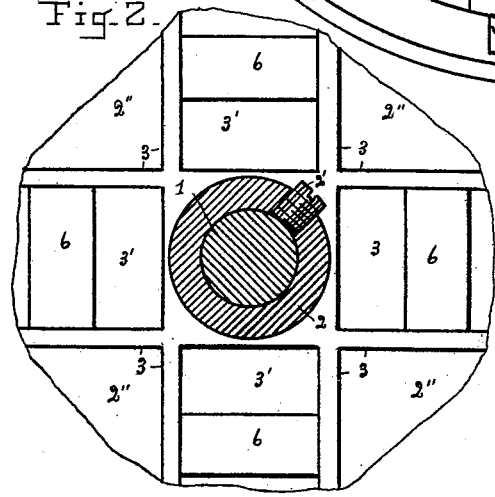
Figure 3:
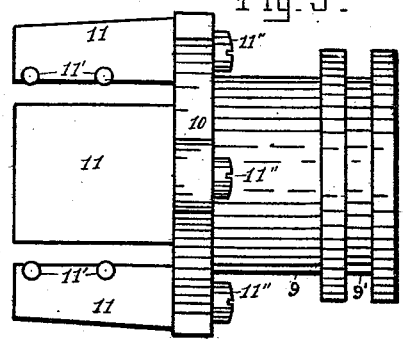
Figure 8:
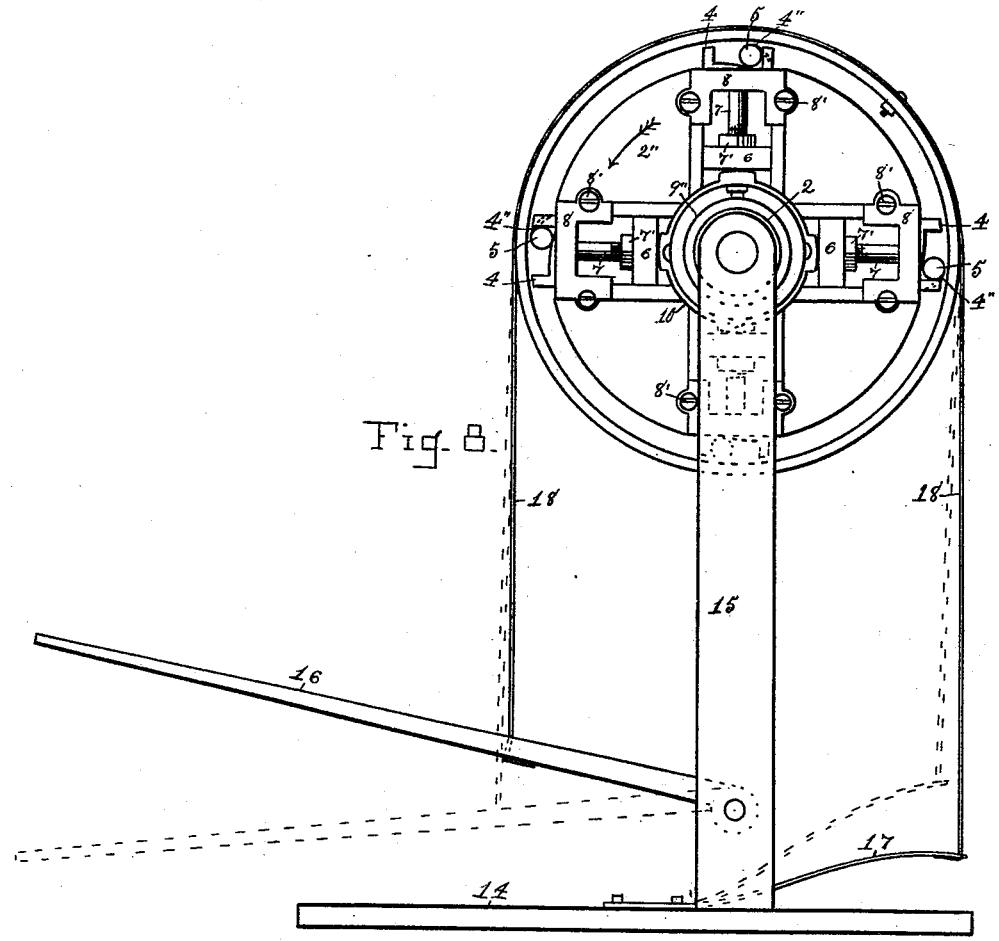

Figure 1 is an elevation of one end of a loose pulley having my improvement applied to it, as it appears in looking toward the left from the line a, a, of Fig. 4, the parts cut by said line being in section and two of the plates 8 being removed. Fig. 2 is an elevation of the central portion of the clutch arms as they appear from the same point of view, the parts cut by said line being also in section, the arms being provided with a hub which is secured upon a shaft, each arm having a planed groove extending radially from the shaft and containing sliding clutching mechanism arranged for connection and disconnection with the inner face of the loose pulley. Fig. 3 is a side elevation of a sliding sleeve adapted for connection with the usual shifting lever, and having upon one end thereof, wedges for operating the clutch mechanism. Fig. 4 is an elevation upon the line b, b, of Fig. 1, as it appears in looking toward the right, showing the loose pulley, the clutch arms and sliding clutch mechanism, in section, and a side view of the sliding sleeve having the usual shifting lever. Fig. 5 is a side elevation of the clutch arms upon their shaft with the loose pulley and sliding sleeve removed therefrom. Fig. 6 is a view in section of one of the friction roller cases at the outer extremity of the clutch arms, taken upon the line c, c, of Fig. 5, and showing the roller therein; Fig. 7, an end view of the sliding sleeve with the clutch operating wedges thereon, and Fig. 8 an end elevation of the clutch pulley upon a reduced scale, showing a lever, or treadle connected with it for the purpose of producing a continuous rotary movement of the clutch shaft by means of the vibratory movement of the lever or treadle.

Similar figures of reference indicate like parts in the several views.

1, indicates the shaft; 2, a hub secured thereon by means of the set screw, 2'; 2'', a connecting web between the arms of the hub; 3, arms of the hub, each having a groove 3', extending radially from the hub; 4, roller cases sliding in said grooves; 4', slots in said roller cases; 4'', springs in said slots; 5, rollers in the cases 4; 5', groove in rollers 5; 6, wedge shaped blocks connected with roller cases 4; 6', friction rollers in wedge blocks 6; 7, bolts connecting wedge blocks 6 and roller cases 4; 7', jam nuts upon said bolts; 8, U-shaped plates which cover a portion of the grooves 3' and retain therein the roller cases 4 and wedge blocks 6; 9, a sliding sleeve; 9', a groove in the sleeve for receiving the shifting lever connection; 10, a flange extending outward from one end of said sleeve; 11, wedges bolted to the sleeve flange; 11' friction rollers in the wedges 11; 11'', bolts connecting the wedges 11 and flange 10; 12, a shifting lever for sliding the sleeve 9; 12', a fulcrum of the lever 12; 12'', a pin connecting the lever and sleeve; 12''', the handle of the lever 12; 13, a pulley loosely journaled upon the shaft 1, between the collar 13' and the hub 2; 14, a floor or fixed support; 15, a standard erected thereon having a clutch shaft journaled in its upper end; 16, a lever, or treadle, having one end hinged upon the standard 15; 17, a spring secured to the floor 14; 18, a strap connected at one end with the lever, or treadle, at the other with the spring 17, and intermediate its ends with the outer face of the pulley rim. The shaft 1, may be of any length desirable and be supported in bearings in the usual manner. The hub 2 of the clutch arms 3 is secured to the shaft in some suitable manner, in the present case it being by means of the set screw 2'. The pulley 13, is fitted to the shaft and is revoluble independently of it between the hub 2 and set collar 13', its rim overhanging the clutch arms so as to receive the action of the clutching mechanism contained therein. The sliding collar 9, carrying the wedges 11 for operating the clutch mechanism is arranged for sliding upon the hub 2, the distance outward from the arms of the clutch being limited by the set collar 9''. The sliding collar is arranged for being moved by the operator, longitudinally upon the hub of the clutch arms, by means of the shifting lever 12, connected to it, and for a fulcrum for it, to any suitable fixed object.

The clutching mechanism is contained within grooves in the arms 3, which grooves extend radially from the shaft, and the arms may be one or more, as the diameter and labor required of the clutch may require, two or more being preferable, and four being shown in the drawings. The hub 2, has for the purpose of strengthening the arms, a connecting web, 2'', extending from arm to arm around the hub, said flange forming the rear side of the grooves, 3'. Within each groove is fitted to slide, longitudinally thereof the wedge shaped block 6 and roller case 4, said block and roller case being connected to each other with a bolt 7. These bolts are preferably made of a six sided steel rod for the purpose of easily applying a wrench for turning them for adjusting the position, relative to the wedge block 6, of the roller case 4. One end of the bolt is loosely journaled in the roller case, 4, and the other threaded and provided with a six sided jam nut, and tapped into the wedge block 6. By means of this bolt and jam nut the roller case is adjusted and secured at the exact distance from the wedge block necessary for the effective working of the clutch and a means is provided for taking up any wear of the parts which their use may produce. The rollers 5 are provided with a groove, 5', intermediate their length for receiving the end of a spring, 4''. The sliding cases 4 are provided with a slot, 4', in which one end of said spring is secured, its other end extending from the case into the groove of the roller, partially encircling the roller and retaining it against the wall of the case, as it is shown to be in Figs. 1, 5 and 6. The office of these springs is, to retain the rollers against the side wall of their case in the angle formed by the bottom of their seat and that side wall of it in which the spring is located, while they are permitted by the resiliency of the spring to roll forward in the operation of clutching the pulley. The bottom of the cases 4, upon which the rollers 5 are located are inclined outward in a circumferential direction, from the point of the natural seat of the rollers, as now seen, so that as the rollers roll forward they are carried farther from the center of the shaft and are forced against the inner face of the rim of the loose pulley. This inclination is preferably a curved surface, although a straight surface may be sufficiently effective in some cases, the curve having a radius of about the distance from the seat of the roller 5 to the center of the shaft, but this curve and the curve of the interior face of the pulley do not have a common center, the center of the former being at one side of the center of the pulley, whereby the rollers 5 as they roll forward in the direction in which the loose pulley is running are carried outward from the shaft and forced into an annular space of decreasing width, and thereby clutch the pulley with an increasing force. The blocks 6 are of a wedging form, longitudinally of the shaft, upon their inner sides and the outer sides of the wedges 11 are of a form corresponding therewith. The latter wedges are bolted to the flange 10 of the sliding sleeve 9, with their thinnest ends entering the grooves 3'. By sliding the sleeves by means of the shifting lever toward the clutch arms the wedges 11 are forced under the wedge blocks 6, raising said blocks, the roller cases 4 and rollers 5, whereby the roller surfaces are caught by the interior face of the pulley rim, and, the pulley being revolved in the direction of the arrow, are carried forward until the rollers are forced against the pulley rim sufficiently hard to effectually clutch the pulley rim. The clutch is released by moving the lever 12 in the opposite direction. Should the motion of the pulley be reversed when running, the rollers are carried back to their natural seats, releasing the contact of the pulley rim and rollers. This feature of the invention is a useful one in applying a lever, or treadle motion, for producing a continuous rotary motion of the clutch shaft. A lever, or treadle motion being applied to the pulley, (see Fig. 8,) for revolving it a part of a revolution, said lever being depressed as shown by the dotted lines of it, the rollers 5 of the clutch arms when properly adjusted, will catch upon the pulley rim, and the clutch arms and shaft be carried by them in the direction of the arrow, to the extent of the throw of said lever, releasing their contact at the end of said throw in consequence of the momentum of the clutch arms, when a spring, 17, will return both pulley and lever to their original positions preparatory to another depression of said lever. The momentum of the clutch arms will keep their shaft in continual motion, while the lever and pulley are making their return movement. The web 2'', of the hub 2 is cut entirely through, as shown in Fig. 4, at the end of the wedges 11, for the purpose of providing a longer seat for their movement, longitudinally of the shaft. The rim of the pulley is shown in the drawings as being adapted to carry a belt upon its outer face and to receive the action of the clutching mechanism upon its inner face. This construction is preferable for clutch pulleys of small, or medium diameter but for those of large diameter the rim carrying the belt may be separate from, and outside of the rim which receives the action of the clutching mechanism.

In order to reduce the friction of the wedges of the device and make the operation quick and easy of connecting and disconnecting the clutch from the pulley rim, friction rollers, 6' and 11', are inserted into the inner side of the wedge block 6 and wedges 11, respectively. Holes are first bored in the several pieces for receiving small rollers that nearly fill the holes, when the inner surfaces of said pieces are planed off so that the rollers when inserted therein, will project slightly beyond said surfaces and receive the pressure produced by the act of forcing the wedges 11 under the wedge blocks 6. By so constructing the several parts, while a great force may be easily applied to the inner face of the pulley rim it can be as easily released therefrom.

Having described my invention, what I claim, and desire to secure by Letters Patent, is—

1. In a clutch pulley, the combination of a pulley loosely revoluble upon a shaft, the pulley having a rim adapted to carry a belt and to receive the action of clutching mechanism upon its interior face, a hub having arms with a groove therein extending radially from said shaft, each arm having in its groove a slidable roller case and wedge block, the former having a roller therein at the outer end of said groove, a sleeve slidable upon the hub of said arms and having wedges thereon arranged to enter said grooves, to engage the wedge block aforesaid and to force the rollers at the outer end of said grooves against the interior face of the rim of said pulley, and means for sliding the sleeve upon the hub of said arms, substantially as described.

2. In a clutch pulley, the combination of a pulley loosely revoluble upon a shaft, the pulley having a rim adapted to carry a belt and to receive the action of clutching mechanism upon the interior face thereof, a hub secured upon said shaft, the hub having arms with a groove therein extending radially from said shaft, each arm having in its groove a slidable roller case and wedge block, the former having a roller therein, the seat of said roller being a curve eccentric with the curve of the pulley rim, whereby, when the rollers are forced outward against said pulley rim and the pulley is revolved in the direction of the arrow, the rollers will roll forward in said direction and be forced into an annular space of decreasing width between said seat and the pulley rim, substantially as set forth.

3. The combination with a shaft and a pulley thereon, of a clutch mechanism consisting of a slotted, slidable case, a grooved roller therein, the groove in the roller corresponding in position with the slot in the case, a spring secured in the case and passing through the slot in said case and resting in the groove of, and partially encircling said roller, said spring being adapted to hold the roller against the side wall of the case while permitting it to roll forward in the act of clutching, substantially as described.

4. The combination with a shaft and a rimmed pulley thereon, of a clutch mechanism consisting of a clutch arm secured to the shaft, a case slidable in a groove in said arm, a roller in said case, a wedge block in said groove, a connecting bolt having one end loosely journaled in the roller case, the other end being threaded, provided with a jam nut and tapped into the wedge block, whereby said case and its roller may be adjusted in position nearer to, or farther from, the rim of said pulley, substantially as set forth.

FRANK L. McKILLIP.

Witnesses:
SILAS BULLARD,
PETER JENNINGS.